United States Patent
Zuo et al.

(10) Patent No.: US 11,048,630 B2
(45) Date of Patent: Jun. 29, 2021

(54) SYMMETRICAL MULTI-PROCESSING NODE

(71) Applicant: International Business Machines Corporation, Armonk, NY (US)

(72) Inventors: Zhen Peng Zuo, Shanghai (CN); Peng Fei Gou, Shanghai (CN); Yang Fan Liu, Shanghai (CN); Yang Liu, Shanghai (CN); Hua Xin Yao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,733

(22) Filed: Nov. 27, 2018

(65) Prior Publication Data

US 2020/0167283 A1     May 28, 2020

(51) Int. Cl.
*G06F 12/08* (2016.01)
*G06F 12/0815* (2016.01)

(52) U.S. Cl.
CPC .. *G06F 12/0815* (2013.01); *G06F 2212/1032* (2013.01)

(58) Field of Classification Search
CPC ............... G06F 12/0815; G06F 2212/1032
USPC ........................................................ 711/141
See application file for complete search history.

(56) References Cited

U.S. PATENT DOCUMENTS

| 6,446,185 | B2 | 9/2002 | Hagersten |
| 7,213,106 | B1 | 5/2007 | Koster et al. |
| 9,460,049 | B2 | 10/2016 | Borkenhagen et al. |
| 2014/0143368 | A1 | 5/2014 | Anderson |
| 2015/0242359 | A1 | 8/2015 | Goryachev et al. |
| 2018/0020054 | A1* | 1/2018 | Woodacre ........... G06F 12/0817 |
| 2018/0121357 | A1 | 5/2018 | Gou et al. |
| 2018/0189675 | A1* | 7/2018 | Nurvitadhi ............. G06F 17/16 |
| 2019/0026233 | A1* | 1/2019 | Schlansker ........... G06F 15/173 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Hua J Song
(74) *Attorney, Agent, or Firm* — Jorge R Maranto

(57) ABSTRACT

A symmetrical multi-processing (SMP) node, a distributed SMP (DSMP) system comprising a plurality of SMP nodes, and a method implemented in the SMP node are disclosed. The SMP node comprises: a plurality of processors, a memory coupled to the plurality of processors, and a memory coherent proxy coupled to the plurality of processors through a coherent accelerator interface. The memory coherent proxy is configured to manage statuses of cache lines in the memory.

14 Claims, 8 Drawing Sheets

SYMMETRICAL MULTI-PROCESSING NODE

BACKGROUND

The present invention relates to computer technology, and more specifically, to a symmetrical multi-processing (SMP) node, a distributed SMP (DSMP) system comprising a plurality of SMP nodes, and a method implemented in the SMP node.

Typically, SMP nodes include multiprocessor-based computer hardware working in conjunction with software architecture. Within the SMP node, all of the processors are identical and symmetrical. Each of the processors in the SMP node also have full access to a single shared main memory. Usually, each processor has access to high-speed memory known as cache. The speed to access localized cache is faster than the speed to access the main memory (hereinafter referred to as "memory" for short).

In the SMP node, the memory and the cache are accessed in blocks of a fixed size (e.g., 64 bytes and 128 bytes). The blocks are called cache lines or cache blocks. When a cache line is copied from memory into the cache, a cache entry is created. Data is stored in the cache, so processors can access data at a faster rate than accessing data from memory. If the data of a cache line in the cache is changed, the data of the corresponding cache line in the memory can also be changed.

A plurality of SMP nodes form a DSMP system. Memory of the DSMP system can be shared among a plurality of SMP nodes. Cache coherency protocol is followed when accessing the memory to avoid any incorrect operations regarding the memory used in a DSMP system.

SUMMARY

According to one embodiment of the present disclosure, an SMP node is provided. The SMP node includes a plurality of processors, a shared memory coupled to the plurality of processors, and a memory coherent proxy coupled to the plurality of processors through a coherent accelerator interface. The memory coherent proxy is configured to manage statuses of cache lines in the memory.

According to another embodiment of the present disclosure, a DSMP system is provided. The DSMP system includes a plurality of SMP nodes. The SMP node comprises: a plurality of processors, a shared memory coupled to the plurality of processors, and a cache coherence proxy coupled to the plurality of processors through a coherent accelerator interface. The memory coherent proxy is configured to manage statuses of at least a part of cache lines to the memory in the DSMP system. A status of a cache line in the memory is managed by at least one cache coherence proxy in the DSMP system.

According to another embodiment of the present disclosure, a method implemented in the SMP node is provided, in accordance with the embodiment of the present disclosure described above. In the method, a first message is sent to the memory coherent proxy by one of the plurality of processors. The first message includes an inquiry about a status of a first cache line in the memory. The status of the first cache line is retrieved. If the first cache line is not operable by the SMP node, the first message is transmitted from the cache coherence proxy to at least one second SMP node. If the first cache line is operable by the SMP node, a first response to the first message is generated by the cache coherence proxy, and the first response is sent from the cache coherence proxy to the processor.

According to another embodiment of the present disclosure, a computer program product is provided. The computer program product includes a computer readable storage medium having program instructions embodied therewith. The program instructions are executable by a processor to implement the method according to the embodiment of the present disclosure as described above.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
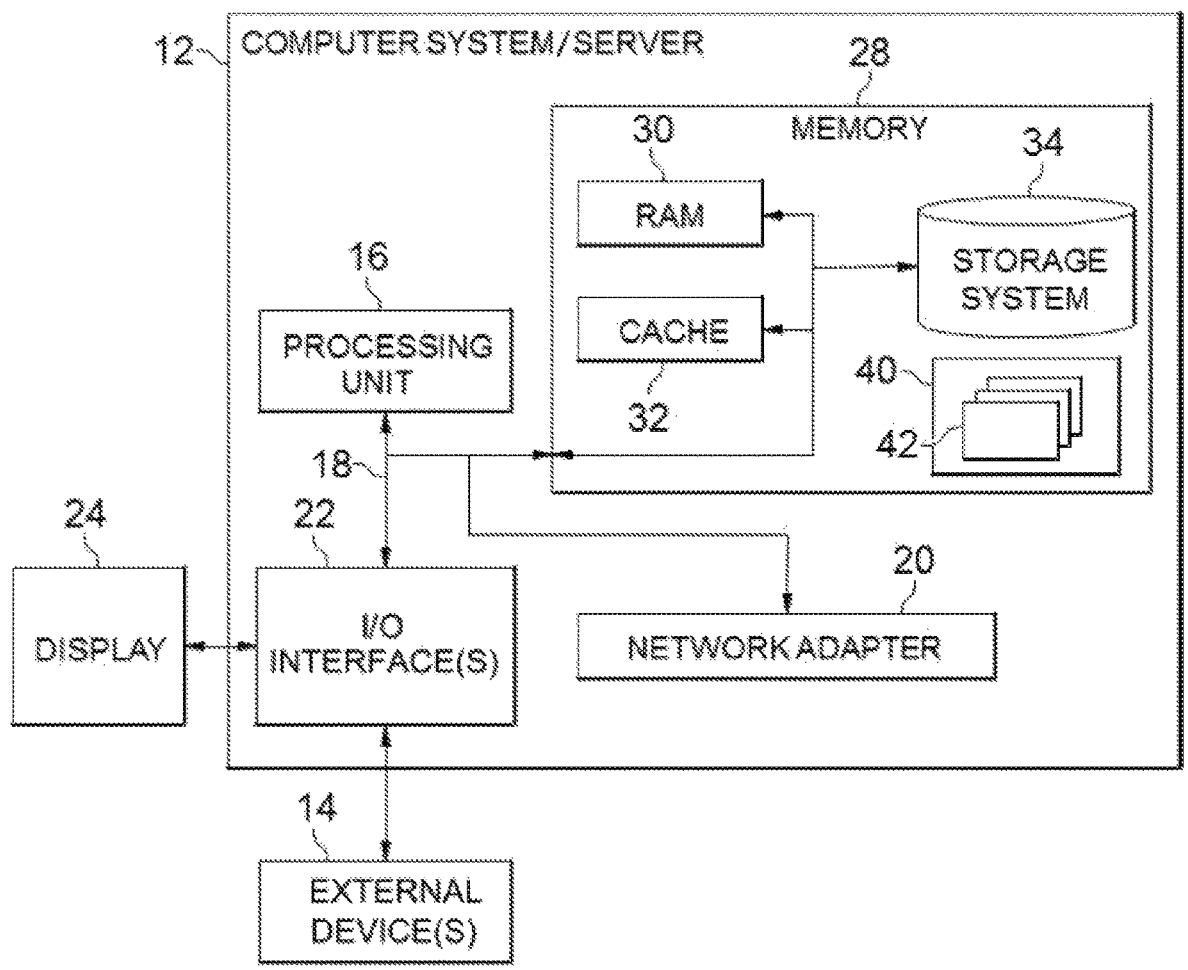
FIG. 1 depicts a cloud computing node according to an embodiment of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, except for limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
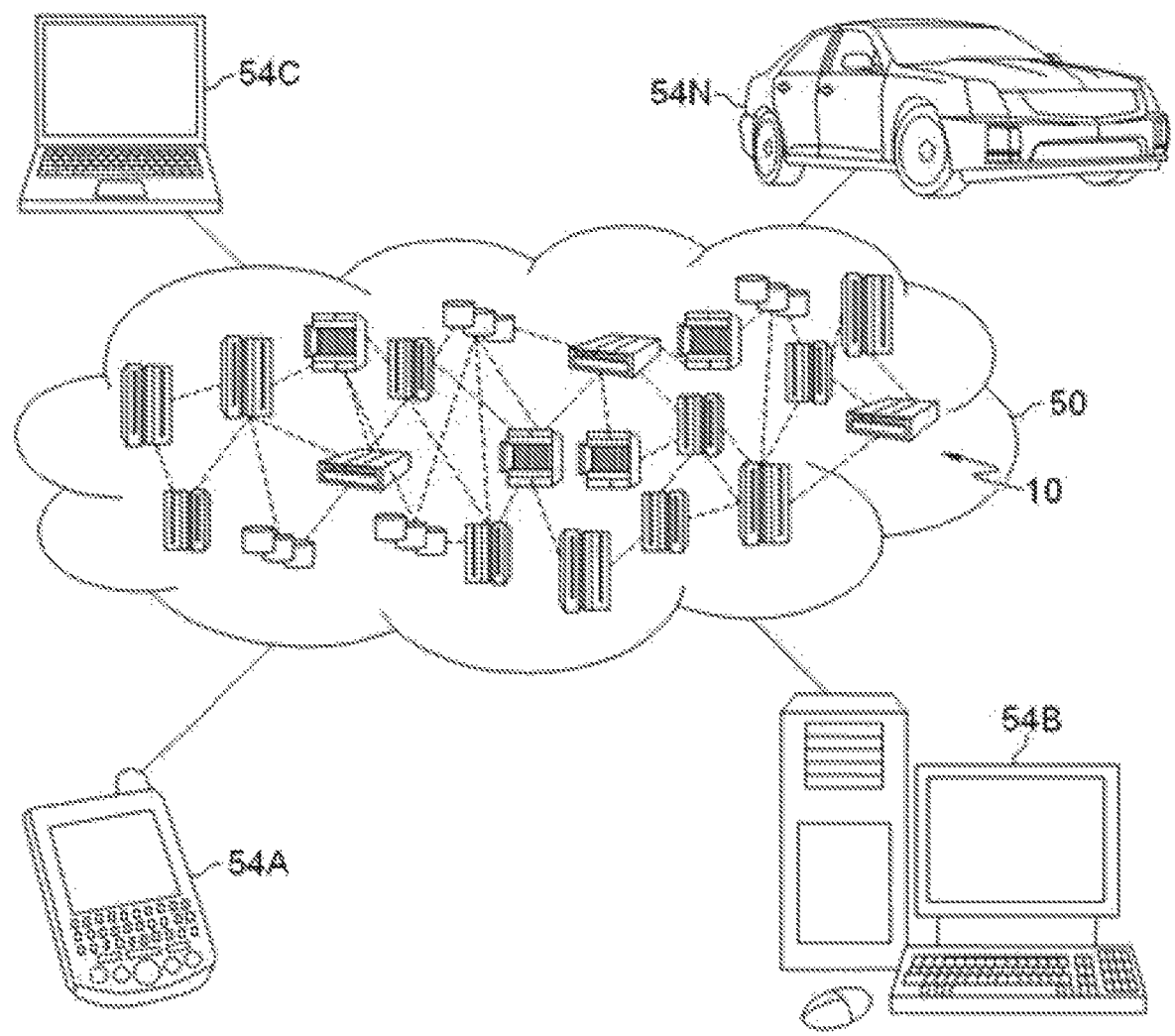
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes with which local computing devices used by cloud consumers, such as, for example, personal digital assistant (PDA) or cellular telephone MA, desktop computer MB, laptop computer MC, and/or automobile computer system MN may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
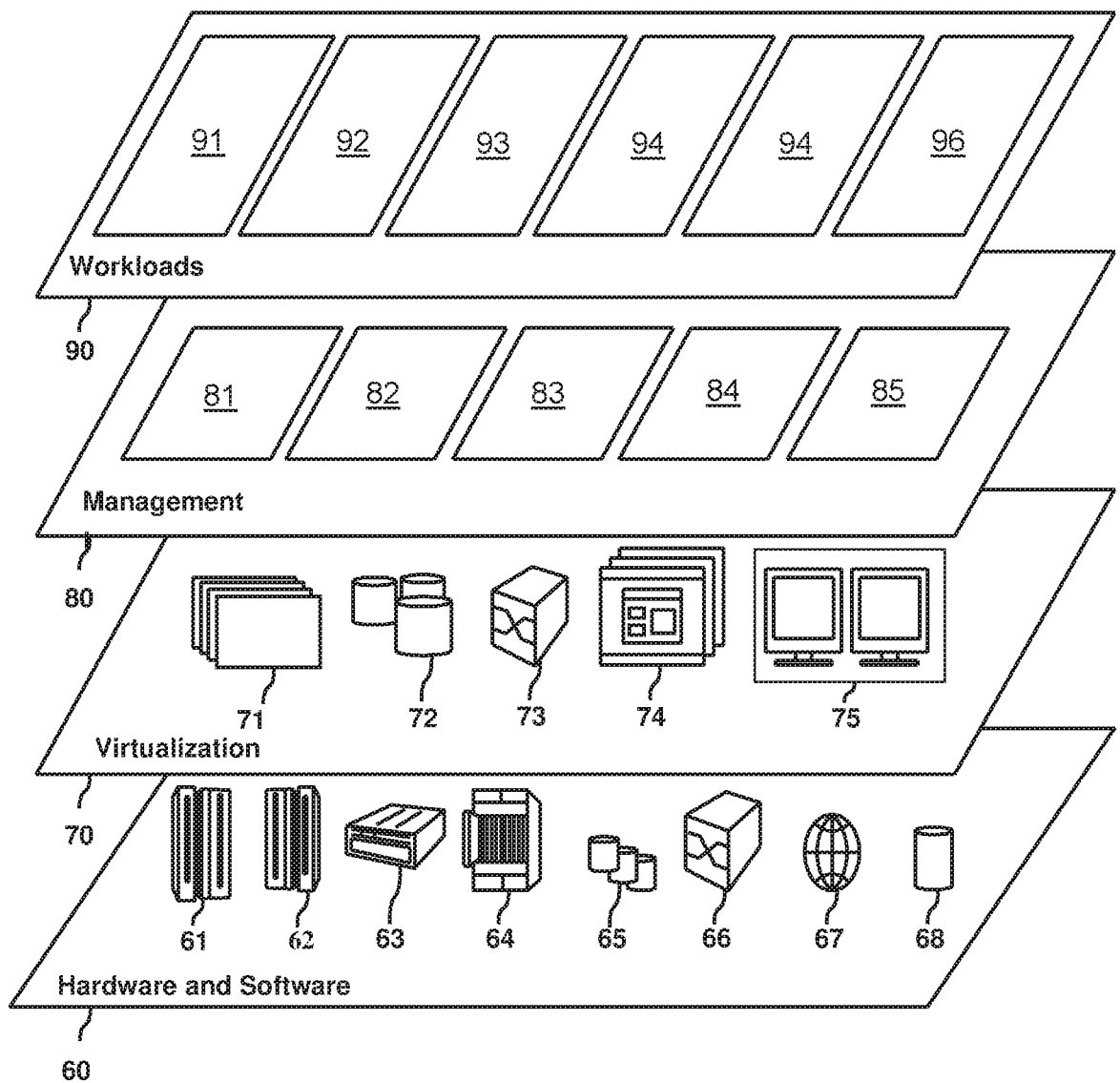
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing of SMP node(s) 96.

In existing DSMP systems, SMP nodes are connected to one another via specific interfaces (e.g., SMP interfaces or DSMP interfaces). Also, SMP nodes are implemented by one-time programmable units. Thus, extending the ability of an existing DSMP system is limited. For example, if the DSMP system can only accommodate four SMP nodes, a new SMP node cannot be added into the DSMP system if four SMP nodes have been implemented into the system. The inability to extend the capabilities of the DSMP system is because the four SMP nodes cannot update their program to accept the new SMP node. Therefore, current DSMP systems are specifically customized, in which the number of SMP nodes is predetermined. Additionally, existing DSMP systems require complex support involving the operating system and various software.

Figure 4:
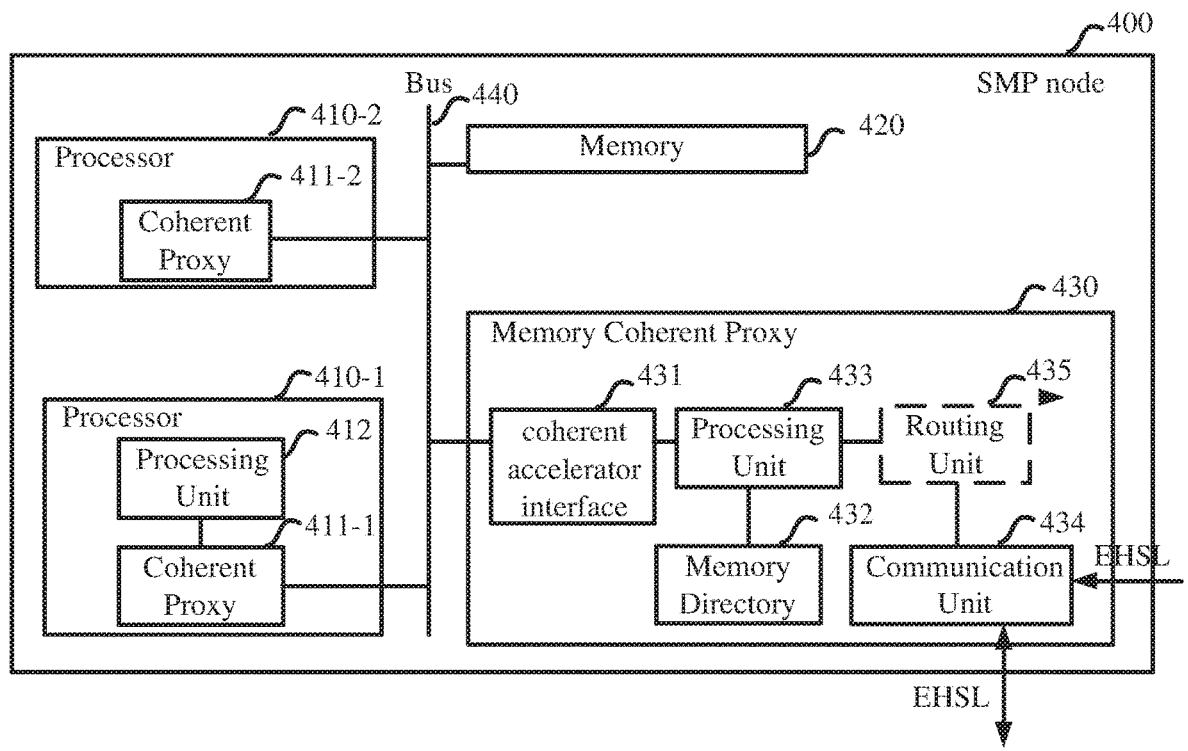
FIG. 4 shows an exemplary block diagram of a SMP node according to an embodiment of the present disclosure.

FIG. 4 illustrates an exemplary block diagram of a SMP node 400, according to an embodiment of the present disclosure. The SMP node 400 can be implemented by adding additional units to the computer system/server 12 as shown in FIG. 1. The SMP node 400 can include a plurality of processors (only processor 410-1 and processor 410-2 are illustrated here), a memory 420, and a memory coherent proxy 430. Hereinafter, the SMP node 400 is referred to as "first SMP node 400", all the processors are referred to as "processor(s) 410" for the sake of simplicity and clarity.

In some embodiments, the memory coherent proxy 430 is implemented by a programmable unit. For example, the memory coherent proxy 430 may be implemented by a coherent accelerator. The coherent accelerator may be implemented by a Field Programmable Gate Array (FPGA). Currently, existing SMP nodes may use an external coherent accelerator to accelerate computation of a Graphic Processing Unit (GPU). In contrast, in some embodiments of the present disclosure, a coherent accelerator is implemented inside the SMP node 400 as the memory coherent proxy 430. Since the memory coherent proxy 430 is programmable, the SMP node 400 may be considered as a programmable SMP node. As such, a DSMP system that includes a plurality of programmable SMP nodes 400 has greater expandability than existing DSMP systems.

As shown in FIG. 4, the processor 410 is coupled to a bus 440 through a coherent proxy 411. The coherent proxy 411 is used to receive and transmit messages from the bus 440. The processor 410 may further comprise a processing unit 412. The processing unit 412 is used to process messages. After processing by the processing unit 412, the messages are adapted for transmission through the coherent proxy 411. The memory 420 is coupled to the bus 440 through a coherent accelerator interface which is not shown in FIG. 4. The coherent accelerator interface, of the memory 420, functions similar to that of the coherent proxy 411. The memory coherent proxy 430 is coupled to the bus 440 through a coherent accelerator interface 431, such that the memory coherent proxy 430 can communicate with the plurality of processors 410 and the memory 420.

The memory coherent proxy 430 manages statuses of cache lines in the memory 420. The status of the cache lines indicates ownership of the particular cache lines. For example, a status of a cache line can indicate that the cache line is operable by the first SMP node 400. In this case, the cache line is owned by the first SMP node 400. Alternatively, the status of the cache line can indicate that the cache line is not operable by the first SMP node. In this case, the cache line is not owned by the first SMP node. The process of managing the status of cache lines in the memory 420 will be described with reference to FIG. 5 discussed below.

As shown in FIG. 4, the memory coherent proxy 430 can include the coherent accelerator interface 431, a memory directory 432, a processing unit 433 and a communication unit 434. The coherent accelerator interface 431 communicates information of the memory coherent proxy 430 with the plurality of processors 410 and the memory 420. The memory directory 432 includes the statuses of the cache lines in the memory 420. For example, the memory directory 432 can be a table which stores the statuses of the cache lines in the memory 420. The processing unit 433 retrieves or changes the statuses of the cache lines in the memory directory 432. The communication unit 434 is used to communicate information of the first SMP node with other SMP node(s). For example, External High-Speed Links (EHSLs) can be used as a communication technique.

The first SMP node can be one of a plurality of SMP nodes in a DSMP system. In the DSMP system, all the SMP nodes have the same structures as the first SMP node. In view of this, the first SMP node may need to communicate with a target SMP node through intermediate SMP nodes. In some embodiments, a routing unit 435 is included in the memory coherent proxy 430. The routing unit 435 can determine a transmission path of an outgoing message, such that the transmission is efficiently transmitted. For example, the routing unit 435 may be a router.

As previously mentioned, the first SMP node 400 can be one of a plurality of SMP nodes in a DSMP system. In the DSMP system, memory of individual SMP nodes can be shared among a plurality of SMP nodes. Therefore, the memory directory 432, of the first SMP node 400, can further include statuses of at least some cache lines stored in the memory of other SMP node(s).

Additionally, in some embodiments, the first SMP node 400 can further include an accelerator function unit. The accelerator function unit is configured to provide an acceleration function for the first SMP node 400. In some embodiments, the accelerator function unit is implemented inside the memory coherent proxy 430. In some other embodiments, the memory coherent proxy 430 is implemented by a coherent accelerator, such that it acts as the acceleration function.

Figure 5:
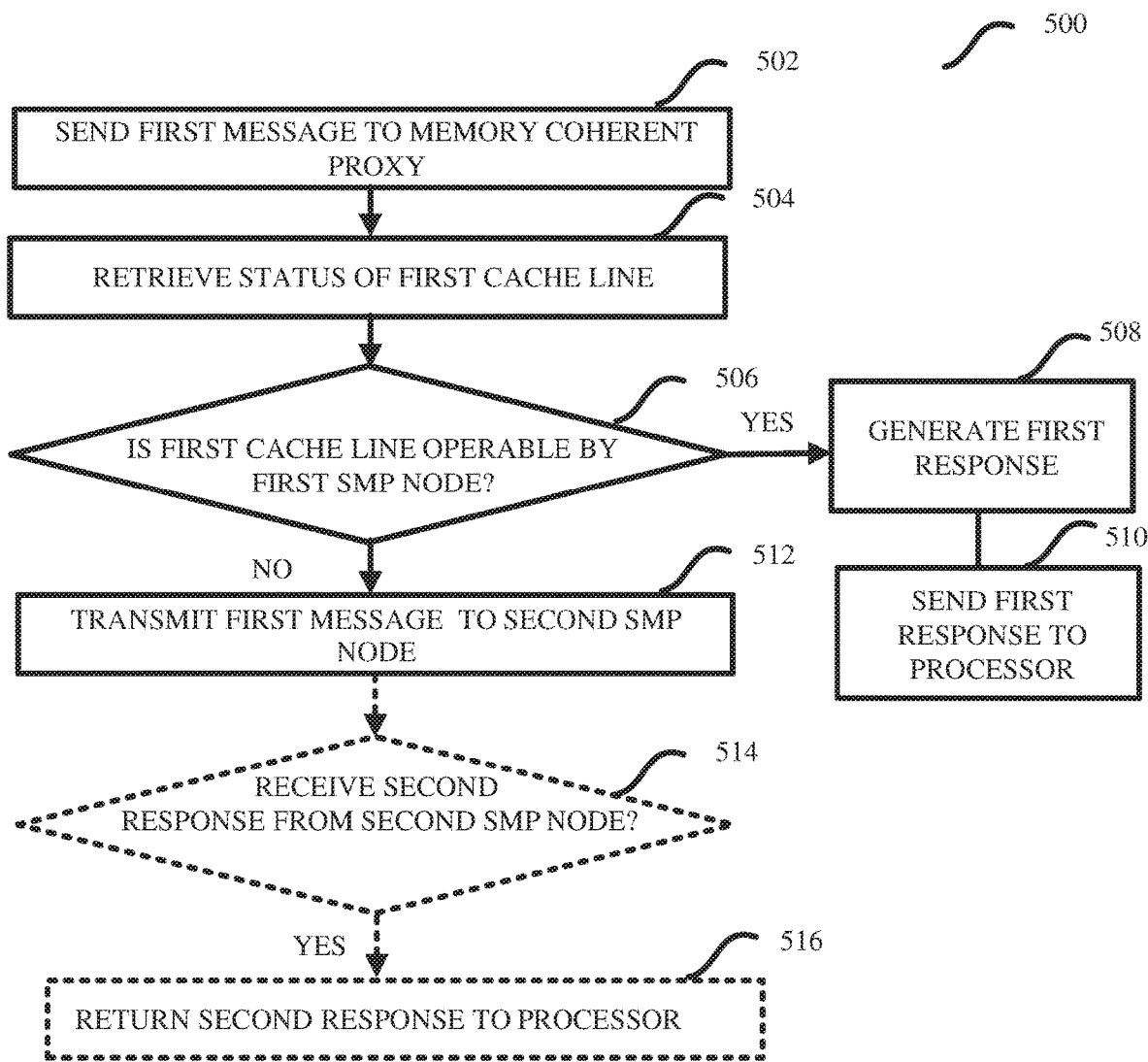
FIG. 5 depicts a schematic flowchart of a method implemented in the SMP node as shown in FIG. 4, according to an embodiment of the present disclosure.

FIG. 5 illustrates a schematic flowchart of a method 500 implemented in a first SMP node 400 shown in FIG. 4, according to an embodiment of the present disclosure.

In the method, one of the plurality of processors 410 send a first message to the memory coherent proxy 430. This is illustrated at step 502. The coherent accelerator interface 431 of the memory coherent proxy 430 receives the first message and forwards it to processing unit 433. The first message can include an inquiry about a status of a first cache line in the memory. The first message can also be a snooping request, read request, or write request. In some embodiments, the first message of read request includes a read command and a snooping request. Similarly, the first message of a write request can include a write command and a snooping request.

The memory coherent proxy 430 retrieves the status of the first cache line. This is illustrated at step 504. In some embodiments, the processing unit 433 retrieves the status of the first cache line from the memory directory 432. As previously mentioned, the status of the first cache line indicates whether the first cache line is operable by the first SMP node 400. For example, the status can include statuses such as modified (M), exclusive (E), shared (S) or invalid (I). If the retrieved status is M, E or S, the first cache line is operable by the first SMP node 400. In this case, the first cache line is owned by the first SMP node 400. If the retrieved status is I, the first cache line is not operable by the first SMP node 400. In this case, the first cache line is not owned by the first SMP node 400.

The method 500 proceeds by determining whether the first cache line is operable by the first SMP node 400. This is illustrated at step 506. If the first cache line is operable by the first SMP node 400, the memory coherent proxy 430 generates a first response to the first message. This is illustrated at step 508. The first response can include the status of the first cache line. The memory coherent proxy 430 proceeds by sending the first response to the processor 410. This is illustrated at step 510. If the first message is a read request, the processor 410 may fetch the data of the first cache line from its corresponding cache line in the cache.

If the first cache line is not operable by the first SMP node, the memory coherent proxy 430 transmits the first message to at least one second SMP node. This is illustrated at step 512. In some embodiments, the first message is transmitted to the second SMP node(s) via the communication unit 434. In some embodiments, the second SMP node refers to any SMP node coupled to the first SMP node 400, which has the same structure of the first SMP node 400 shown in FIG. 4. For example, if the first SMP node is coupled to three SMP nodes, the memory coherent proxy 430 may transmit the first message to the three SMP nodes respectively.

In some embodiments, a second SMP node returns a response (hereinafter referred to as "second response") to the first message only if it owns the first cache line. If the first message includes a snooping request, the second response can include the status of the first cache line. If the first message includes a read request, the second response includes the status of the first cache line and the data of the first cache line. If the first message includes a write request, the second response includes the status of the first cache line and an acknowledgement of successfully writing the first cache line.

Optionally, the method 500 can further include the steps shown in block 514 and 516. As shown, the method 500 proceeds by determining whether the second response is received from the at least one second SMP node. This is illustrated at step 514. If the memory coherent proxy 430 receives the second response from the at least one second SMP node, the memory coherent proxy 430 returns the second response to the processor 410. This is illustrated at step 516. If the second message is a write request, the first SMP node 400 owns the first cache line after writing the first cache line. Therefore, if the memory directory 432 does not include the status of the first cache line, the memory coherent proxy 430 records the status of the first cache line in the memory directory 432.

Figure 6:
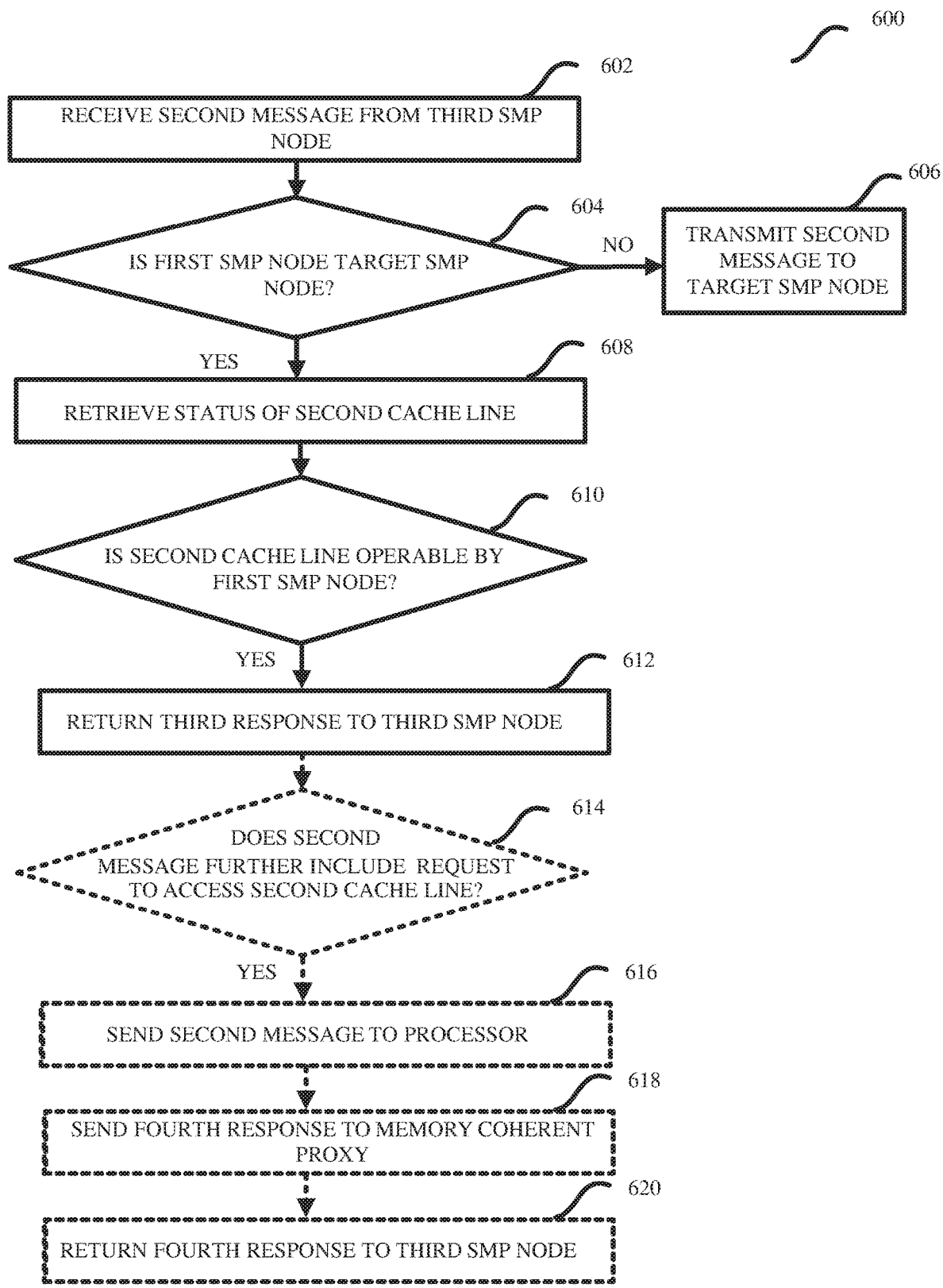
FIG. 6 depicts a schematic flowchart of a method implemented in the SMP node as shown in FIG. 4, according to an embodiment of the present disclosure.

FIG. 6 is a schematic flowchart of a method 600, implemented in a first SMP node as shown in FIG. 4, according to embodiments of the present disclosure.

The method 600 begins by receiving a second message from a third SMP node sent to the memory coherent proxy 430. This is illustrated at step 602. In some embodiments, the second message is received by the communication unit 434. In some embodiments, the third SMP node refers to a SMP node other than the second SMP node. The third SMP node can also refer to the second SMP node in some other embodiments. Here, the third SMP node has at least the structure of the first SMP node 400 as shown in FIG. 4. The third SMP node can determine which SMP node the second message is sent to (hereinafter referred to as "target SMP node"). Thus, the second message can include an indication of a target SMP node. In addition, the second message can include an inquiry about a status of a second cache line stored in the memory.

The method 600 proceeds by determining whether the first SMP node is the target SMP node. This is illustrated at step 604. If the first SMP node is not the target SMP node, the memory coherent proxy 430 transmits the second message to the target SMP node. This is illustrated at step 606. The routing unit 435 can help to determine the transmission path to the target SMP node.

If the first SMP node 400 is the target SMP node, the memory coherent proxy 430 retrieves the status of the second cache line. This is illustrated at step 608. The action of retrieving the status of the second cache line is the same as the action of retrieving the status of the first cache line as described at step 504 of FIG. 5.

The method 600 proceeds by determining whether the second cache line is operable by the first SMP node 400. This is illustrated at step 610. If the second cache line is operable by the first SMP node 400, the memory coherent proxy 430 will generate a third response to the second message. The third response includes the status of the second cache line. The memory coherent proxy 430 proceeds by returning the third response to the third SMP node. This is illustrated at step 612.

As shown, the method 600 may further include the steps shown in blocks 614-620. The method 600 proceeds determining whether the second message further includes a request to access the second cache line. This is illustrated at step 614. For example, the second message may be of a read request that includes a snooping request as well as a read command.

If the second message also includes a request to access the second cache line, the memory coherent proxy 430 sends the second message to the processor 410. This is illustrated at step 616. If the second message includes a read request to read the second cache line, the processor 410 may read the corresponding cache line in its local cache. If the second message includes a write request to write the second cache line, the processor 410 may write the corresponding cache line in its local cache. If the memory directory 432 does not include the status of the second cache line, the memory coherent proxy 430 records the status of the second cache line into the memory directory 432.

The processor 410 sends a fourth response to the second message to the memory coherent proxy. This is illustrated at step 618. If the processor 410 receives a read request, the processor 410 may send the data in the corresponding second cache line. If the processor 410 receives a write request, it may send an acknowledgment indicating a successful write to the second cache line. The method 600 proceeds by having the memory coherent proxy 430 return the fourth response to the third SMP node. This is illustrated at step 620.

Figure 7:
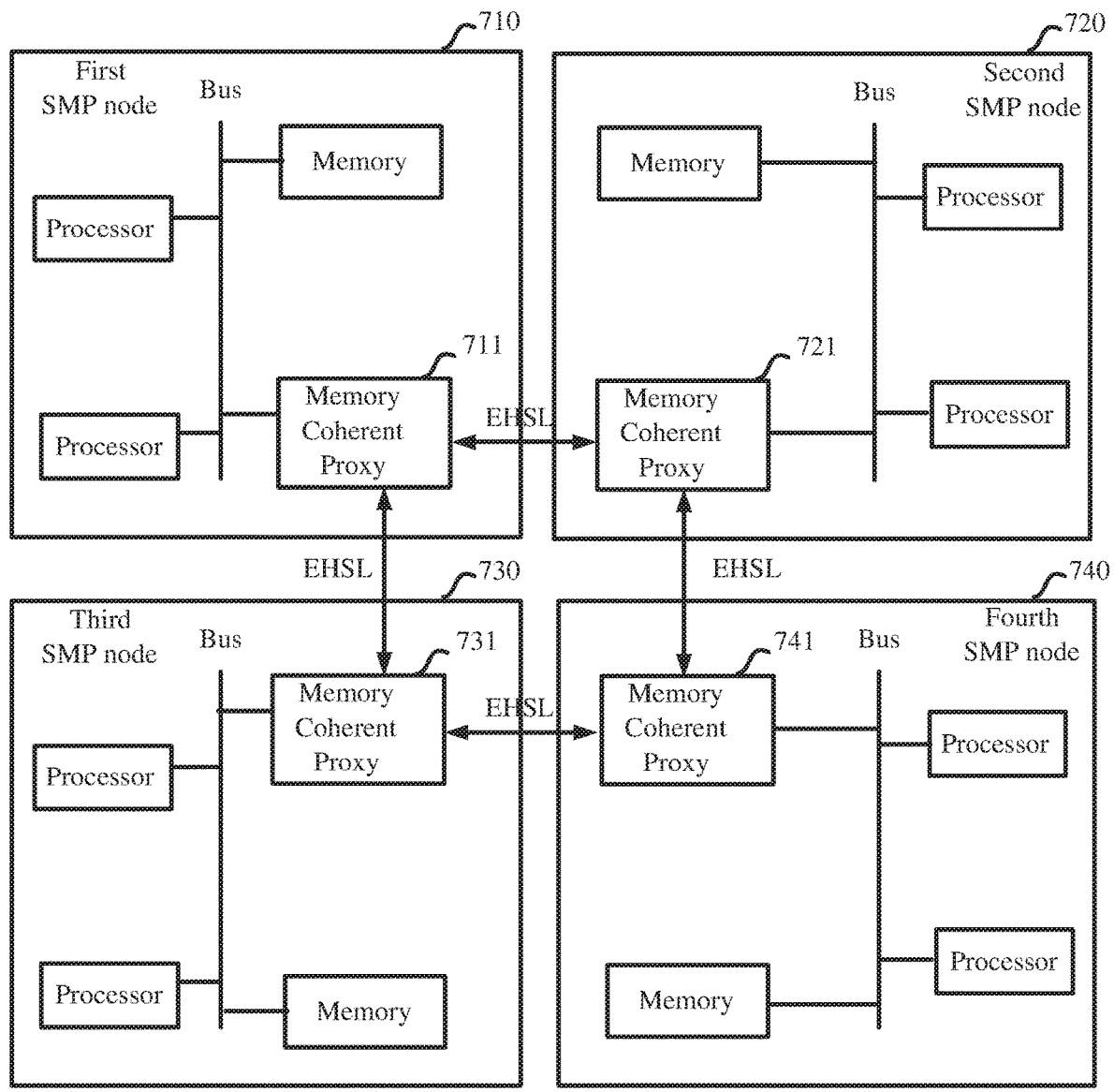
FIG. 7 shows an exemplary block diagram of a DSMP system according to an embodiment of the present disclosure.

FIG. 7 illustrates an exemplary block diagram of a DSMP system, according embodiments of the present disclosure. The DSMP system can comprises a plurality of SMP nodes that include at least the structure of the first SMP node 400 shown in FIG. 4. In FIG. 7, only four SMP nodes are illustrated. It is to be noted that a DSMP system may include more SMP nodes. As illustrated, the first SMP node 710, the second SMP node 720, the third SMP node 730, and the fourth SMP node 740 are identical. Each SMP node includes a plurality of processors, a memory, and a memory coherent proxy.

In the DSMP system, the memory of each of the SMP nodes 710, 720, 730, 740 may be considered as a global memory. Each memory coherent proxy 711, 721, 731, 741 manages statuses of at least a part of the cache lines in the global memory of the DSMP system. In some embodiments, each memory coherent proxy 711, 721, 731, 741 manages statuses of all the cache lines in the global memory of the DSMP system.

In some embodiments, each memory coherent proxy 711, 721, 731, 741 manages statuses of a part of the cache lines in the global memory of the DSMP system. For example, a status of a cache line in the memory may be managed by more than one memory coherent proxy in the DSMP system.

In another example, a status of a cache line in the memory may be managed by only one memory coherent proxy in the DSMP system.

In the DSMP system, the SMP nodes 710, 720, 730, 740 may communicate with one another according to the method described above in FIG. 4 and FIG. 5.

Figure 8:
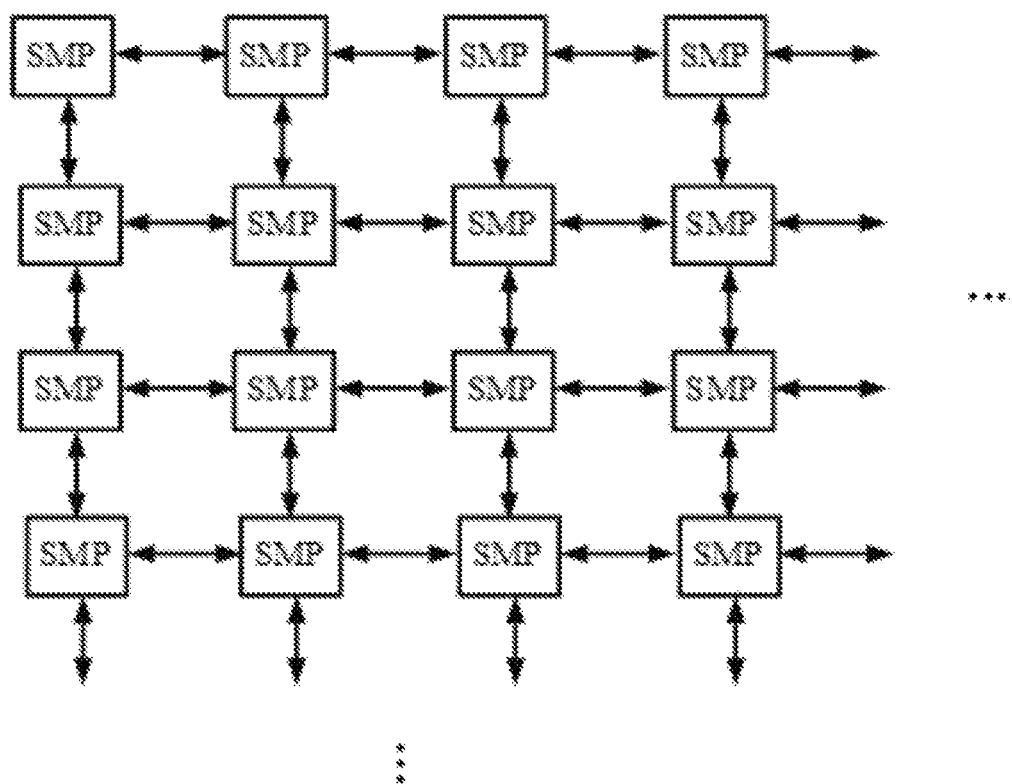
FIG. 8 illustrates a dynamic scalable architecture of the DSMP system according to an embodiment of the present disclosure.

Embodiments of the present disclosure disclose an SMP node with an innovative structure. In addition, embodiments also disclose a DSMP system with a dynamically scalable architecture. FIG. 8 illustrates a dynamically scalable architecture of the DSMP system. As the memory coherent proxies of the SMP nodes, in the DSMP system, are implemented by programmable units, it is possible to program the memory coherent proxies to accept additional SMP nodes. Thus, additional SMP nodes can be added into the DSMP system. Therefore, the scalability of the disclosed DSMP system is greater than existing DSMP systems. In addition, embodiments of the disclosed DSMP system do not need to be supported by complicated operating systems and software.

Under the same inventive concept, embodiments of the present disclosure provide for a computer program product. The computer program product comprises a computer readable storage medium having program instructions embodied therewith. The program instructions are executable by a processor to send, by one of the plurality of processors, a first message to the memory coherent proxy, wherein the first message includes an inquiry about a status of a first cache line in the memory; retrieve, by the memory coherent proxy, the status of the first cache line; in response to the first cache line being not operable by the first SMP node, transmit the first message from the memory coherent proxy to at least one second SMP node; and in response to the first cache line being operable by the first SMP node, generate a first response to the first message by the memory coherent proxy; and send the first response from the memory coherent proxy to the one of the plurality of processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A symmetrical multi-processing (SMP) node comprising:
   a plurality of processors;
   a memory coupled to the plurality of processors; and
   a memory coherent proxy coupled to the plurality of processors through a coherent accelerator interface,
      wherein the memory coherent proxy is configured to manage statuses of cache lines stored in the memory, the memory coherent proxy further configured to receive a message from a second SMP node, wherein the message includes an indication of a target SMP node and an inquiry about a status of a first cache line in the memory.

2. The SMP node according to claim 1, wherein the memory coherent proxy is implemented by a programmable unit.

3. The SMP node according to claim 1, wherein the memory coherent proxy comprises:
   the coherent accelerator interface configured to communicate with the plurality of processors and the memory;
   a memory directory comprising the statuses of the cache lines in the memory;
   a processing unit configured to retrieve the statuses of the cache lines in the memory of the memory directory, the processing unit further configured to change the statuses of the cache lines in the memory of the memory directory; and
   a communication unit configured to communicate with at least one second SMP node.

4. The SMP node according to claim 3, wherein processing unit is further configured to change the statuses of the cache lines in the memory of the memory directory.

5. The SMP node according to claim 3, wherein the memory coherent proxy further comprises:
   a routing unit configured to determine a transmission path for an outgoing message.

6. The SMP node according to claim 3, wherein the memory directory further comprises statuses of at least a part of cache lines stored in a memory of at least one second SMP node.

7. A distributed SMP (DSMP) system comprising a plurality of SMP nodes, wherein an individual SMP node of the plurality of SMP nodes comprises:
   a plurality of processors;
   a memory coupled to the plurality of processors;
   a memory coherent proxy coupled to the plurality of processors through a coherent accelerator interface;
      wherein the memory coherent proxy is configured to manage statuses of at least a part of cache lines stored in a memory of the DSMP system, the memory coherent proxy further configured to receive a message from a second SMP node, wherein the message includes an indication of a target SMP node and an inquiry about a status of a second cache line in the memory; and
   wherein a status of a cache line in the memory is managed by at least one memory coherent proxy in the DSMP system.

8. The DSMP system according to claim 7, wherein the status of the cache line in the memory is managed by the memory coherent proxy of at least one of the plurality of SMP nodes in the DSMP system.

9. The DSMP system according to claim 7, wherein the memory coherent proxy further comprises:
   a routing unit configured to determine a transmission path for an outgoing message.

10. The DSMP system according to claim 7, wherein the processors are further configured to change the statuses of the cache lines in the memory of a memory directory.

11. A computer program product implemented in a SMP node, wherein the computer program product comprises a computer readable storage medium having program instructions embodied therewith, wherein the program instructions are executable by processor to implement a method comprising:
   sending, by one of a plurality of processors, a first message to a memory coherent proxy, wherein the first message includes an inquiry about a status of a first cache line in the memory;
   retrieving, by the memory coherent proxy, the status of the first cache line;
   in response to the first cache line being not operable by the SMP node,
      transmitting the first message from the memory coherent proxy to at least one second SMP node;
   in response to the first cache line being operable by the SMP node, generating a first response to the first message by the memory coherent proxy; and sending the first response from the memory coherent proxy to the one of the plurality of processors;

in response to receiving by the memory coherent proxy a second message from a third SMP node, wherein the second message includes an indication of a target SMP node and an inquiry about a status of a second cache line in the memory, in response to the SMP node being not the target SMP node, transmitting the second message from the memory coherent proxy to the target SMP node; and in response to the SMP node being the target SMP node, retrieving, by the memory coherent proxy, the status of the second cache line; and returning, in response to the second cache line being operable by the SMP node, a third response to the second message to the third SMP node by the memory coherent proxy.

12. The computer program product according to claim 11, wherein in response to the first cache line being not operable by the SMP node, the method further comprising:

returning, in response to receiving a second response to the first message from the at least one second SMP node, the second response to the one of the plurality of processors by the memory coherent proxy.

13. The computer program product according to claim 11, wherein in response to the first cache line being not operable by the SMP node, the method further comprises:

recording, in response to the first message further including a request to write the first cache line, the status of the first cache line in a memory directory by the memory coherent proxy.

14. The computer program product according to claim 11, wherein in response to the second cache line being operable by the SMP node, the method further comprises:

in response to the second message further including a request to access the second cache line, sending, by the memory coherent proxy, the second message to the at least one of the plurality of processors;

sending, by the one of the plurality of processors, a fourth response to the second message to the memory coherent proxy; and returning, by the memory coherent proxy, the fourth response to the third SMP node.

* * * * *